US012812247B2

(12) United States Patent
Ogawa et al.

(10) Patent No.: US 12,812,247 B2
(45) Date of Patent: Nov. 24, 2026

(54) IMAGING APPARATUS HAVING FLEXIBLE PRINTED CIRCUIT WITH FILTER CIRCUIT

(71) Applicant: FUJIFILM Corporation, Tokyo (JP)

(72) Inventors: Shingo Ogawa, Saitama (JP); Masahiko Miyata, Saitama (JP); Naoya Kusumoto, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 161 days.

(21) Appl. No.: 18/752,721

(22) Filed: Jun. 24, 2024

(65) Prior Publication Data

US 2025/0008218 A1 Jan. 2, 2025

(30) Foreign Application Priority Data

Jun. 28, 2023 (JP) ................................ 2023-106419

(51) Int. Cl.
*H04N 23/68* (2023.01)
*G01P 3/00* (2006.01)

(52) U.S. Cl.
CPC ........... *H04N 23/6812* (2023.01); *G01P 3/00* (2013.01); *H04N 23/687* (2023.01)

(58) Field of Classification Search
CPC ..... H04N 23/6812; H04N 23/687; G01P 3/00
See application file for complete search history.

(56) References Cited

U.S. PATENT DOCUMENTS

| | | | | |
|---|---|---|---|---|
| 12,080,108 | B1 * | 9/2024 | Volkerink | G07C 5/008 |
| 2008/0298790 | A1 * | 12/2008 | Uenaka | H04N 23/68 396/55 |
| 2009/0269046 | A1 * | 10/2009 | Yamazaki | G03B 5/02 396/55 |
| 2017/0103804 | A1 * | 4/2017 | Mitani | G11C 11/419 |
| 2018/0088441 | A1 | 3/2018 | Yamazaki et al. | |

FOREIGN PATENT DOCUMENTS

| | | |
|---|---|---|
| JP | 2013178565 | 9/2013 |

* cited by examiner

*Primary Examiner* — Christopher K Peterson
(74) *Attorney, Agent, or Firm* — JCIPRNET

(57) ABSTRACT

An imaging apparatus includes an angular velocity sensor for shake correction and a flexible printed circuit. The flexible printed circuit includes the angular velocity sensor and a plurality of wiring lines for transmission of a digital control signal from a control circuit to the angular velocity sensor. The flexible printed circuit is provided with a filter circuit for suppression of a specific frequency of the control signal.

20 Claims, 7 Drawing Sheets

IMAGING APPARATUS HAVING FLEXIBLE PRINTED CIRCUIT WITH FILTER CIRCUIT

CROSS-REFERENCE TO RELATED APPLICATIONS

The present application claims priority under 35 U.S.C. § 119 to Japanese Patent Application No., 2023-106419 filed on Jun. 28, 2023. The above application is hereby expressly incorporated by reference, in its entirety, into the present application.

BACKGROUND

1. Technical Field

The present disclosed technology relates to an imaging apparatus.

2. Description of the Related Art

Described in JP2013-178565 A is a lens barrel that includes a fixing member including a plane portion parallel to an optical axis of an imaging optical system, a flexible printed circuit fixed to the plane portion, and an angular velocity sensor detecting an angular velocity with respect to a predetermined detection axis. On the plane portion, the angular velocity sensor is fixed to a surface of the flexible printed circuit that is opposite to a surface fixed to the plane portion such that the detection axis is approximately orthogonal to the plane portion. As described in paragraph [0030] of JP2013-178565 A, an amplification circuit that amplifies an analog output signal from the angular velocity sensor and a filter circuit that affects the analog output signal from the angular velocity sensor are mounted on the flexible printed circuit.

SUMMARY

One embodiment of the present disclosed technology provides an imaging apparatus with which it is possible to suppress deterioration of the signal quality of a control signal transmitted to an angular velocity sensor for shake correction.

An imaging apparatus according to an aspect of the present disclosure includes an angular velocity sensor for shake correction and a flexible printed circuit that includes the angular velocity sensor and a plurality of wiring lines for transmission of a digital control signal for controlling of operation of the angular velocity sensor. The flexible printed circuit is provided with a filter circuit for suppression of a specific frequency of the control signal.

It is preferable that the flexible printed circuit includes a first wiring part in which patterns of the plurality of wiring lines are formed in parallel, one end of the first wiring part is provided with a connecting portion that is connected to a control circuit sending the control signal, and the other end of the first wiring part is provided with a circuit portion on which electronic components including the angular velocity sensor and the filter circuit are mounted.

It is preferable that the circuit portion includes a first circuit portion and a second circuit portion and a second wiring part is provided between the first circuit portion and the second circuit portion.

It is preferable that the second wiring part is flexible.

It is preferable that the first circuit portion and the second circuit portion are disposed such that a first plane and a second plane intersect each other with the second wiring part bent, where the first plane is a plane on which the first circuit portion is disposed and the second plane is a plane on which the second circuit portion is disposed.

It is preferable that the first plane and the second plane are orthogonal to each other.

It is preferable that the circuit portion further includes a third circuit portion and a third wiring part is provided between the second circuit portion and the third circuit portion.

It is preferable that the third wiring part is flexible.

It is preferable that the first circuit portion, the second circuit portion, and the third circuit portion are disposed such that a first plane, a second plane, and a third plane intersect each other with the second wiring part and the third wiring part bent, where the first plane is a plane on which the first circuit portion is disposed, the second plane is a plane on which the second circuit portion is disposed, and the third plane is a plane on which the third circuit portion is disposed.

It is preferable that the first plane, the second plane, and the third plane are orthogonal to each other.

It is preferable that the angular velocity sensor is provided for each of three axes which are a pitch axis, a yaw axis, and a roll axis and at least the angular velocity sensor for the pitch axis and the angular velocity sensor for the yaw axis are mounted on the second circuit portion or the third circuit portion.

It is preferable that the angular velocity sensor for the roll axis is mounted on the first circuit portion.

It is preferable that the filter circuit is mounted on the first circuit portion.

It is preferable that the first wiring part has a structure in which the patterns are formed on only one surface of the first wiring part and flexibility of the first wiring part is higher than flexibility of the circuit portion.

It is preferable that the first wiring part has a structure in which the patterns are formed on only one surface of the first wiring part and no protection film is provided.

It is preferable that the circuit portion has a structure in which the patterns are formed on both surfaces of the circuit portion.

It is preferable that the electronic components are mounted on only one surface of the circuit portion.

It is preferable that a vibration-reducing member is attached to a surface of the circuit portion that is opposite to the one surface on which the electronic components are mounted.

It is preferable that a thickness of the vibration-reducing member is larger than a thickness of the flexible printed circuit.

It is preferable that the filter circuit is provided for a specific wiring line among the plurality of wiring lines, of which a control signal communication frequency is equal to or lower than a set frequency.

It is preferable that the specific wiring line is a chip select communication line through which a chip select signal for selection of one of a plurality of circuits to be controlled in serial communication is transmitted as the control signal.

BRIEF DESCRIPTION OF THE DRAWINGS

Exemplary embodiments according to the technique of the present disclosure will be described in detail based on the following figures, wherein.

DETAILED DESCRIPTION

Figure 1:
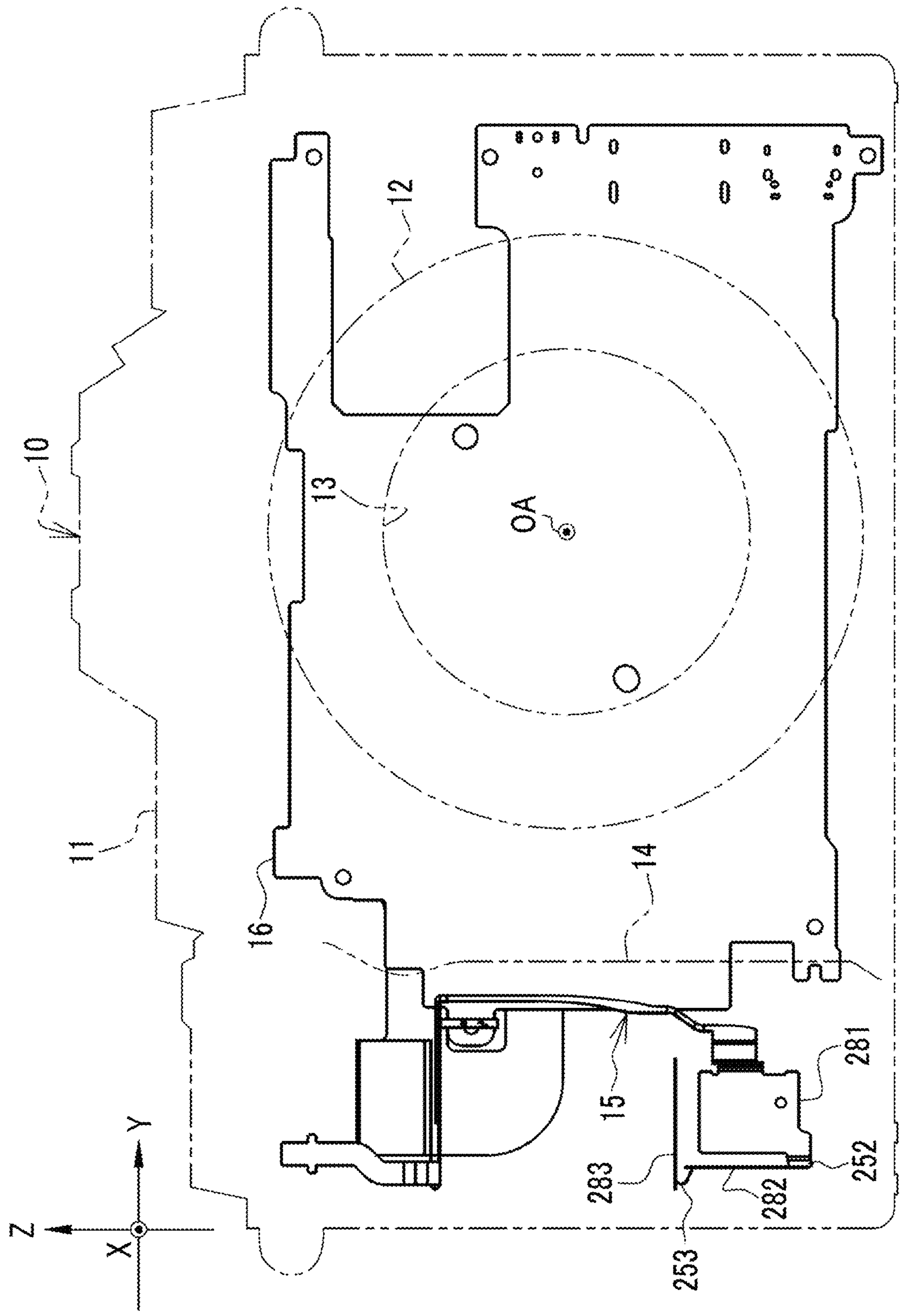
FIG. 1 is a view showing a configuration of an imaging apparatus.

For example, as shown in FIG. 1, an imaging apparatus 10 is a mirrorless single-lens digital camera and includes an apparatus main body 11. A front surface of the apparatus main body 11 is provided with a lens mount 12. The lens mount 12 includes a circular imaging aperture 13. An interchangeable imaging lens (not shown) is attachably and detachably mounted on the lens mount 12. A grip portion 14 on which a right hand of a user is placed during imaging or the like is provided at a left portion of the apparatus main body 11. Note that regarding the imaging apparatus 10, the imaging lens may be installed such that the imaging lens is made not attachable and detachable.

An imaging element (not shown) is disposed in the imaging aperture 13. The imaging element is, for example, a complementary metal oxide semiconductor (CMOS) image sensor or a charge coupled device (CCD) image sensor. The imaging element includes a rectangular imaging surface used to image a subject. Two sides of the imaging surface, which are orthogonal to each other, are parallel to a Y-axis and a Z-axis, respectively. In addition, the center of the imaging surface coincides with an optical axis OA of the imaging lens.

Here, in a case where a bottom surface of the imaging apparatus 10 is placed on a horizontal surface, the Y-axis is parallel to a horizontal direction and the Z-axis is parallel to a vertical direction. A Y-axis direction is a width direction of the apparatus main body 11 and a Z-axis direction is a height direction of the apparatus main body 11. Note that in the present specification, a term related to an angle like "being orthogonal" means not only being perfectly orthogonal or the like but also means being substantially orthogonal with an error allowed in design and manufacturing (for example, an error of about ±10% from a design value) or the like. In addition, a term "being parallel" means not only being perfectly parallel but also means being substantially parallel with an error allowed in design and manufacturing (for example, an error of about ±10% from a design value). In addition, a term "to coincide" means not only to perfectly coincide but also means to substantially coincide with an error allowed in design and manufacturing (for example, an error of about ±10% from a design value).

The imaging surface receives subject light. As is well known, on the imaging surface, pixels that photoelectrically convert the received subject light and output electric signals are arranged in a two-dimensional manner along the Y-axis and the Z-axis. The entire imaging surface is exposed to the outside through the imaging aperture 13.

The imaging element is provided with a shake correction mechanism (not shown) for correction of a subject image shake that is caused by vibration applied to the imaging apparatus 10. The shake correction mechanism includes an actuator such as a voice coil motor that moves a movable portion, to which the imaging element is attached, along a YZ plane with respect to a fixed portion fixed to the apparatus main body 11.

Here, the term "shake" refers to a phenomenon that occurs in a case where a change of the optical axis OA with respect to a subject image occurs due to vibration. The term "the change of the optical axis OA" means, for example, a phenomenon in which the optical axis OA is inclined with respect to a reference axis (for example, the optical axis OA before occurrence of a shake) due to a shake. The term "shake correction" not only means to remove a shake but also means to reduce a shake.

A flexible printed circuit (FPC) 15 and a control substrate 16 are built into the apparatus main body 11. The flexible printed circuit 15 is disposed inside the grip portion 14. The control substrate 16 is disposed at a position where the control substrate 16 and a rear surface of the apparatus main body 11 face each other such that a front surface and the rear surface of the control substrate 16 are parallel to the YZ plane.

Figure 2:
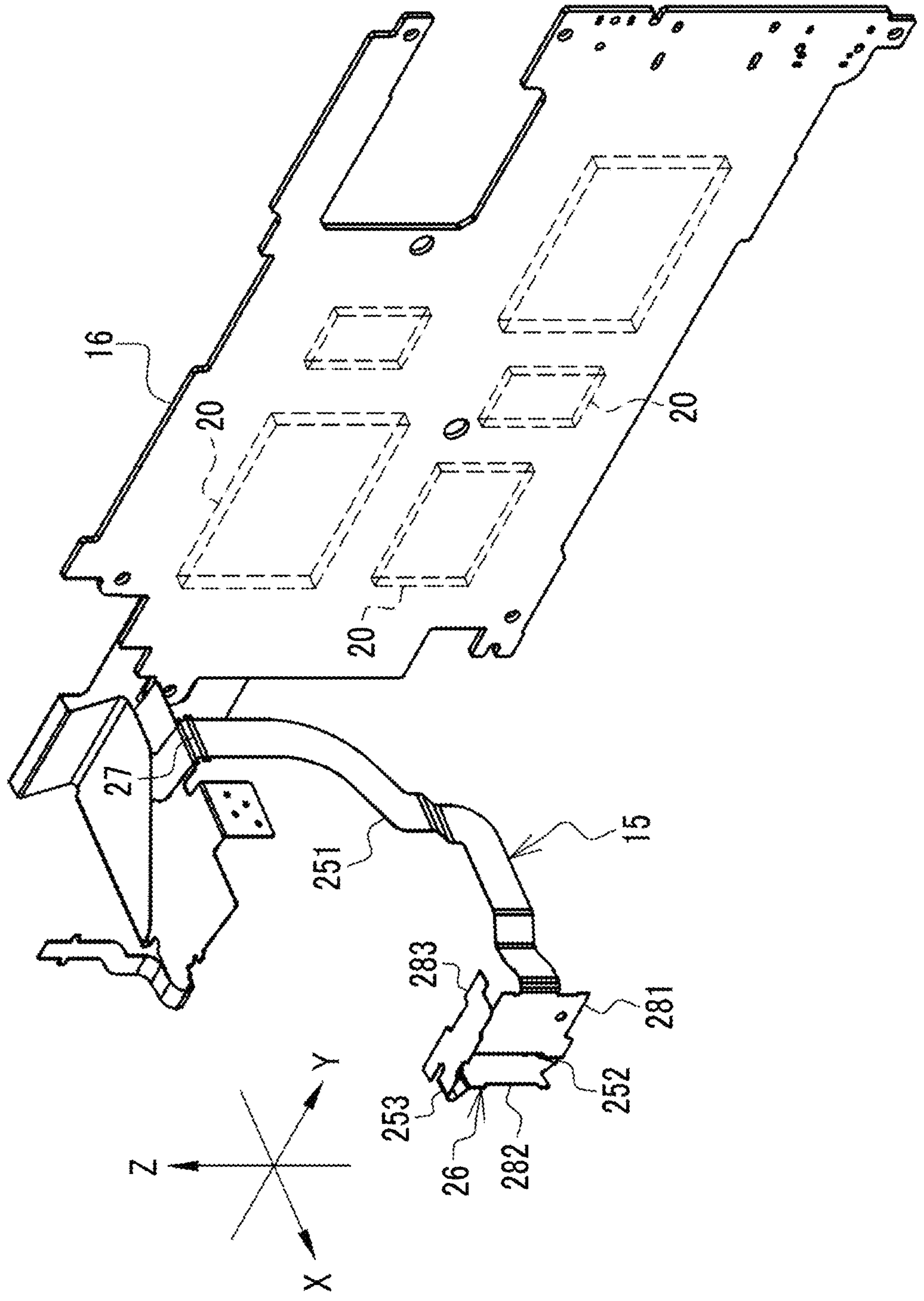
FIG. 2 is a perspective view of a flexible printed circuit and a control substrate.

For example, as shown in FIG. 2, a control circuit 20 is formed on the control substrate 16. The control circuit 20 controls the operation of angular velocity sensors 30 (refer to FIG. 3) for shake correction, the angular velocity sensors 30 being installed on the flexible printed circuit 15. The control circuit 20 sends, to the angular velocity sensors 30, a digital control signal for the controlling of the operation of the angular velocity sensors 30. In addition, the control circuit 20 receives an output signal from the angular velocity sensor 30. The control circuit 20 sends a drive signal to a voice coil motor of the shake correction mechanism based on the output signal from the angular velocity sensor 30. The shake correction mechanism causes the imaging element to move by an amount for correction of a shake in a direction for correction of the shake, in accordance with the drive signal. Note that the control circuit 20 controls not only the operation of the angular velocity sensors 30 and the shake correction mechanism but also the operation of each unit of the imaging apparatus 10 such as the imaging element and a rear-surface display.

Figure 3:
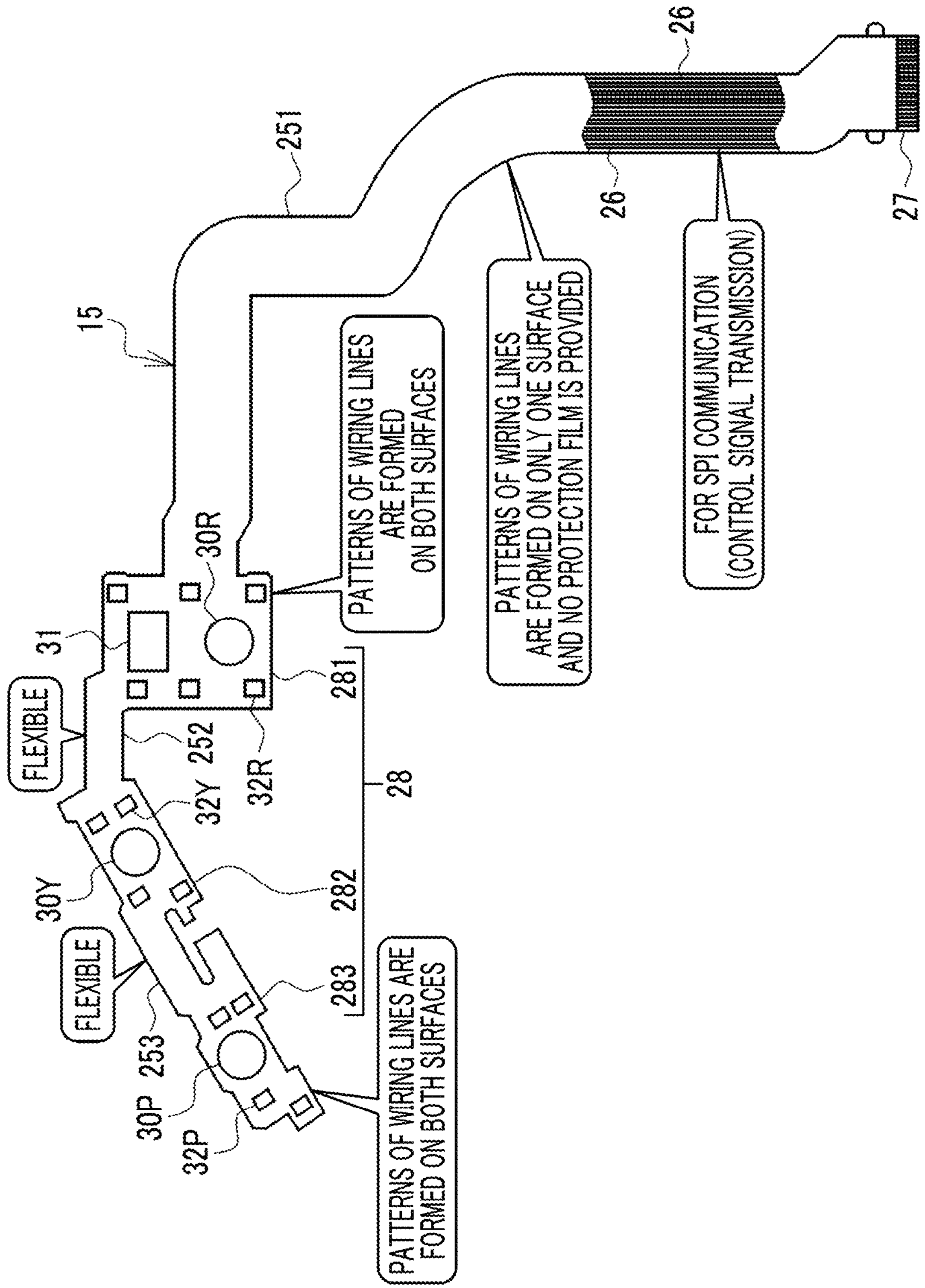
FIG. 3 is a plan view of the flexible printed circuit.

For example, as shown in FIG. 3, the flexible printed circuit 15 includes a first wiring part 251 that is flexible. At the first wiring part 251, patterns of a plurality of wiring lines 26 are formed in parallel. Each of intervals between the plurality of wiring lines 26 is, for example, an interval of 100 μm to 500 μm, and the width of the first wiring part 251 is, for example, 0.5 cm to 2 cm. The first wiring part 251 has an elongated belt-like shape of which a longitudinal direction is parallel to a direction in which the wiring lines 26 extend. That is, the first wiring part 251 is a flexible flat cable (FFC). Through the wiring lines 26, the control signal from the control circuit 20 is transmitted to the angular velocity sensors 30 and the output signal from the angular velocity sensors 30 is transmitted to the control circuit 20. Here, the control signal is a signal for communication with a serial peripheral interface (hereinafter, referred to as SPI), and the wiring lines 26 are wiring lines for SPI communication. The SPI communication is an example of "serial communication" according to the present disclosed technology.

A connector 27 that is connected to the control substrate 16 (the control circuit 20) is provided at one end of the first wiring part 251. The connector 27 is an example of a "connecting portion" according to the present disclosed technology. In addition, a circuit portion 28 having a stiffness is provided at the other end of the first wiring part 251.

The circuit portion 28 is composed of a first circuit portion 281, a second circuit portion 282, and a third circuit portion 283. The first circuit portion 281 and the second circuit portion 282 are connected to each other by a second wiring part 252 that is flexible and short. In addition, the second circuit portion 282 and the third circuit portion 283 are connected to each other by a third wiring part 253 that is flexible and short. The first circuit portion 281, the second circuit portion 282, and the third circuit portion 283 are arranged in this order from the first wiring part 251 side. Note that although the wiring lines 26 are provided at the second wiring part 252, the third wiring part 253, the first circuit portion 281, the second circuit portion 282, and the third circuit portion 283 also in practice, the wiring lines 26 provided thereat are not shown in the drawing in order to avoid complication.

A plurality of electronic components including the angular velocity sensor 30, a filter circuit 31 for suppression of a specific frequency of the control signal (for example, a frequency equal to or higher than 32 MHz), drivers 32 of the angular velocity sensor 30, and the like are mounted on the circuit portion 28. More specifically, electronic components including an angular velocity sensor 30R for a roll axis, the filter circuit 31, a driver 32R of the angular velocity sensor 30R, and the like are mounted on the first circuit portion 281. Electronic components including an angular velocity sensor 30Y for a yaw axis, a driver 32Y of the angular velocity sensor 30Y, and the like are mounted on the second circuit portion 282. Electronic components including an angular velocity sensor 30P for a pitch axis, a driver 32P of the angular velocity sensor 30P, and the like are mounted on the third circuit portion 283. Note that contrary to the present example, the electronic components including the angular velocity sensor 30P for the pitch axis, the driver 32P of the angular velocity sensor 30P, and the like may be mounted on the second circuit portion 282, and the electronic components including the angular velocity sensor 30Y for the yaw axis, the driver 32Y of the angular velocity sensor 30Y, and the like may be mounted on the third circuit portion 283. As described above, one angular velocity sensor 30 is provided for each of three axes which are the pitch axis, the yaw axis, and the roll axis and at least the angular velocity sensor 30P for the pitch axis and the angular velocity sensor 30Y for the yaw axis are mounted on the second circuit portion 282 or the third circuit portion 283.

In the present example, the roll axis is an X-axis, the pitch axis is the Y-axis, and the yaw axis is the Z-axis. The angular velocity sensor 30R for the roll axis detects rotation around the X-axis which is the roll axis, that is, the angular velocity sensor 30R detects lateral shake vibration. The angular velocity sensor 30P for the pitch axis detects rotation around the Y-axis which is the pitch axis, that is, the angular velocity sensor 30P detects vertical shake vibration. The angular velocity sensor 30Y for the yaw axis detects rotation around the Z-axis which is the yaw axis, that is, the angular velocity sensor 30Y detects yaw shake vibration. The X-axis is orthogonal to the Y-axis and the Z-axis. In a case where the bottom surface of the apparatus main body 11 is placed on a horizontal surface, the X-axis direction is a horizontal direction as with the Y-axis direction. In addition, the X-axis direction is a depth direction of the apparatus main body 11.

Each of the first circuit portion 281, the second circuit portion 282, and the third circuit portion 283 has a substantially rectangular flat plate-like shape. The size of the first circuit portion 281 is slightly larger than the sizes of the second circuit portion 282 and the third circuit portion 283 since the filter circuit 31 is mounted thereon. The second circuit portion 282 and the third circuit portion 283 have substantially the same size as each other.

The first wiring part 251 has a structure in which the patterns of the wiring lines 26 are formed on only one surface of the first wiring part 251 and the first wiring part 251 is provided with no protection film (also called a cover lay), so that the flexibility of the first wiring part 251 is higher than the flexibility of the circuit portion 28. In contrast, the circuit portion 28 has a structure in which patterns of the wiring lines 26 are formed on both surfaces.

Figure 4:
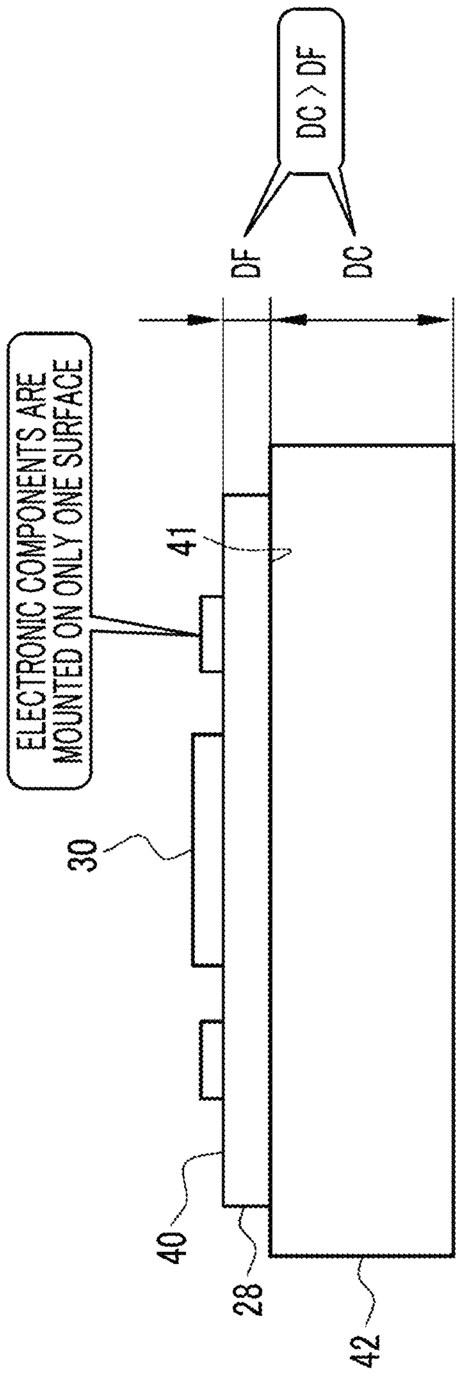
FIG. 4 is a view showing a circuit portion and a cushion.

The first wiring part 251 is bent as appropriate in a case where the flexible printed circuit 15 is disposed in the grip portion 14 (refer to FIGS. 1 and 2). The second wiring part 252 and the third wiring part 253 are also bent as appropriate. Since the second wiring part 252 and the third wiring part 253 are bent as described above, a front surface and a rear surface (a mounting surface 40 and an attachment surface 41 which are shown in FIG. 4) of the first circuit portion 281 on which the angular velocity sensor 30R for the roll axis is mounted are made parallel to the YZ plane. In addition, a front surface and a rear surface of the second circuit portion 282 on which the angular velocity sensor 30Y for the yaw axis is mounted are made parallel to an XZ plane. Furthermore, a front surface and a rear surface of the third circuit portion 283 on which the angular velocity sensor 30P for the pitch axis is mounted are made parallel to an XY plane. That is, the first circuit portion 281, the second circuit portion 282, and the third circuit portion 283 are disposed such that planes (the YZ plane, the XZ plane, and the XY plane) on which the circuit portions are respectively disposed intersect each other. More specifically, the planes on which the first circuit portion 281, the second circuit portion 282, and the third circuit portion 283 are respectively disposed are orthogonal to each other. Here, the YZ plane is an example of a "first plane" according to the present disclosed technology, the XZ plane is an example of a "second plane" according to the present disclosed technology, and the XY plane is an example of a "third plane" according to the present disclosed technology.

For example, as shown in FIG. 4, an electronic component such as the angular velocity sensor 30 (any of the angular velocity sensor 30P, the angular velocity sensor 30Y, or the angular velocity sensor 30R) is mounted on only one surface (which is shown as the mounting surface 40) of the circuit portion 28 (any of the first circuit portion 281, the second circuit portion 282, or the third circuit portion 283). A cushion 42 for suppression of unnecessary vibration being applied to the angular velocity sensors 30 is attached to a surface of the circuit portion 28 that is shown as the attachment surface 41 and that is opposite to the mounting surface 40. The cushion 42 is a foamed body block having a size sufficient to cover the entire attachment surface 41. A thickness DC of the cushion 42 is greater than a thickness DF of the circuit portion 28, that is, the flexible printed circuit 15. The cushion 42 is an example of a "vibration reducing member" according to the present disclosed technology. Note that the term "unnecessary vibration" means, for example, vibration that is different from vibration attributable to a camera shake caused by a user and that occurs inside the imaging apparatus 10 like vibration accompanied by the operation of a mechanical shutter mechanism.

Figure 5:
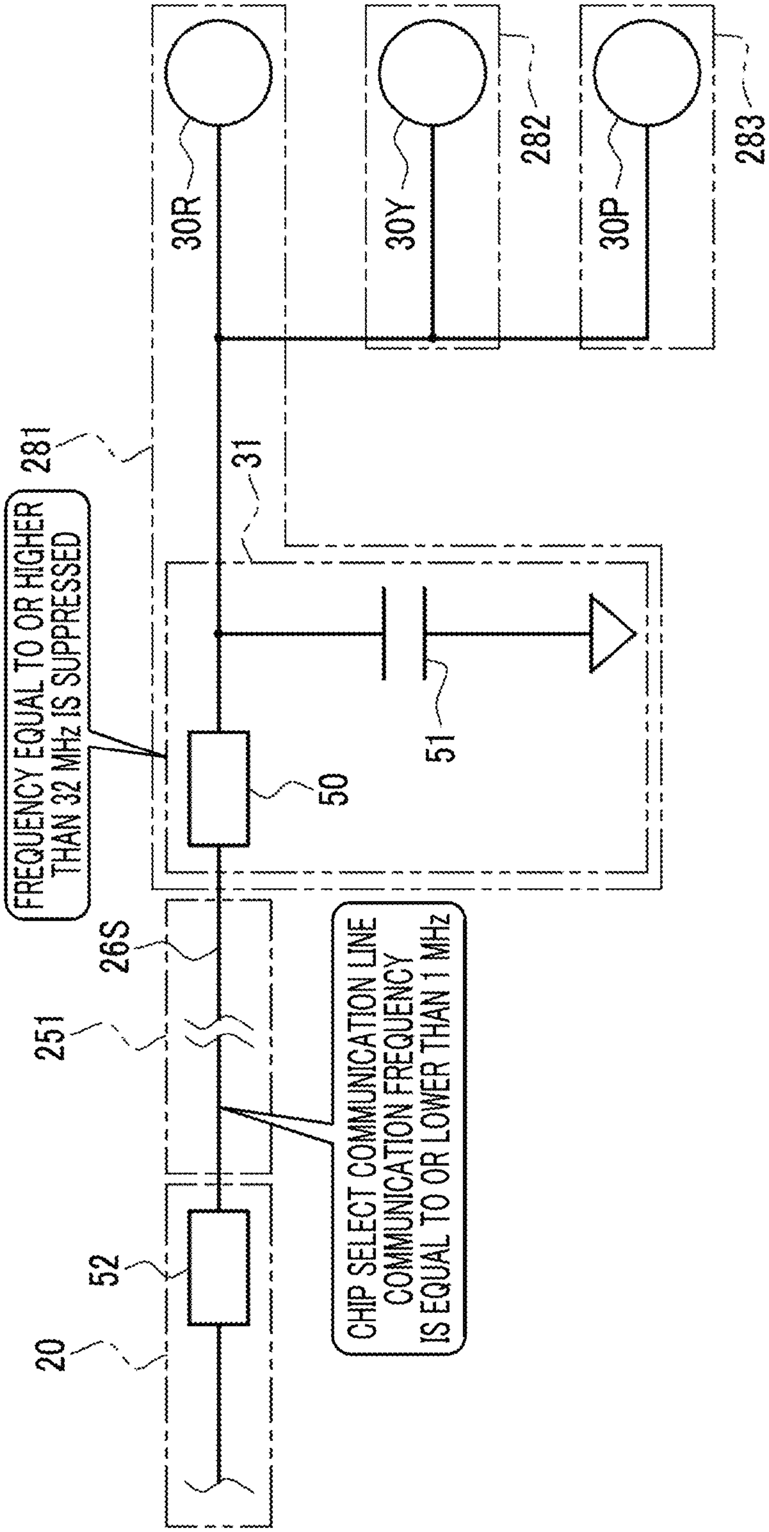
FIG. 5 is a simple circuit diagram of the flexible printed circuit and the control substrate.

For example, as shown in FIG. 5, the filter circuit 31 is provided for only one specific wiring line 26S among the plurality of wiring lines 26. The specific wiring line 26S is the wiring line 26 of which a control signal communication frequency is equal to or lower than a set frequency. The set frequency is, for example, 1 MHz. More specifically, the specific wiring line 26S is a chip select communication line through which a chip select signal is transmitted as a control signal. The chip select signal is a signal for selection of one of a plurality of circuits (for example, integrated circuits) to be controlled such as the drivers 32 installed at the circuit portion 28.

The filter circuit 31 is an RC circuit composed of a resistor 50 and a capacitor 51, that is, a low-pass filter circuit. The filter circuit 31 allows a low-frequency component, which is a signal component of the chip select signal, to pass therethrough and blocks a high-frequency noise on the chip select signal. A value matching required performance is set as a time constant $\tau$=RC that determines the cut-off frequency (for example, a frequency equal to or higher than 32 MHz) of the high-frequency noise. Note that a reference numeral "52" denotes a damping resistor that is mounted in the control circuit 20 and that is for noise reduction and for suppression of overshoot and undershoot. In addition, in FIG. 5, the drivers 32 of the angular velocity sensors 30 are not shown.

The flexible printed circuit 15 is connected to the control circuit 20 of the control substrate 16 via the connector 27. The control circuit 20 sends a control signal of the angular velocity sensors 30 such as a chip select signal. The control signal is transmitted to the angular velocity sensors 30 mounted on the circuit portion 28 through the connector 27 and the wiring lines 26 of the first wiring part 251, the second wiring part 252, and the third wiring part 253. The angular velocity sensors 30 operate in accordance with the control signal.

As shown in FIG. 3 and the like, the flexible printed circuit 15 is provided with the filter circuit 31 for suppression of a specific frequency of a digital control signal that is transmitted to the angular velocity sensors 30 to control the operation of the angular velocity sensors 30. Therefore, it is possible to suppress deterioration of the signal quality of a control signal. Consequently, a frequency at which malfunction of the angular velocity sensors 30 occurs can be reduced.

The first wiring part 251 of the present example is made relatively long so that the first wiring part 251 is connected to the circuit portion 28 from the control substrate 16 disposed near the rear surface of the apparatus main body 11, the circuit portion 28 being disposed in the grip portion 14 of the apparatus main body 11 in which the influence of unnecessary vibration on the angular velocity sensors 30 is relatively small. In addition, the first wiring part 251 is thin so that the first wiring part 251 occupies a small space and does not transmit unnecessary vibration from the control substrate 16 to the angular velocity sensors 30 and thus intervals between the patterns of the plurality of wiring lines 26 are extremely small. Therefore, regarding the first wiring part 251 of the present example, the influence of crosstalk is more remarkable and there is a high probability that deterioration of the signal quality of a control signal occurs. Accordingly, the effect of provision of the filter circuit 31 is considerably large.

As shown in FIG. 3, the flexible printed circuit 15 includes the first wiring part 251 in which the patterns of the plurality of wiring lines 26 are formed in parallel. The one end of the first wiring part 251 is provided with the connector 27 that is connected to the control circuit 20 sending a control signal and the other end of the first wiring part 251 is provided with the circuit portion 28 on which electronic components including the angular velocity sensors 30 and the filter circuit 31 are mounted. Since the other end of the first wiring part 251 is provided with the circuit portion 28 as described above, a probability that unnecessary vibration is applied to the angular velocity sensors 30 mounted on the circuit portion 28 can be reduced.

As shown in FIG. 3, the circuit portion 28 includes the first circuit portion 281, the second circuit portion 282, and the third circuit portion 283. The second wiring part 252 is provided between the first circuit portion 281 and the second circuit portion 282 and the third wiring part 253 is provided between the second circuit portion 282 and the third circuit portion 283. Since the circuit portion 28 is divided into the first circuit portion 281, the second circuit portion 282, and the third circuit portion 283 and the first to third circuit portions are connected to each other by the second wiring part 252 and the third wiring part 253 as described above, electronic components such as the angular velocity sensors 30 and the filter circuit 31 can be disposed in a distributed manner.

As shown in FIG. 3, the second wiring part 252 and the third wiring part 253 are flexible. In addition, since the second wiring part 252 and the third wiring part 253 are bent as shown in FIGS. 1 and 2, the first circuit portion 281, the second circuit portion 282, and the third circuit portion 283 are disposed such that the planes (the YZ plane, the XZ plane, and the XY plane) on which the circuit portions are respectively disposed intersect each other. More specifically, the planes on which the first circuit portion 281, the second circuit portion 282, and the third circuit portion 283 are respectively disposed are orthogonal to each other. Therefore, rotation around each of the Y-axis which is the pitch axis, the Z-axis which is the yaw axis, and the X-axis which is the roll axis can be accurately detected, the X-axis, the Y-axis, and the Z-axis being orthogonal to each other.

As shown in FIG. 3, as the angular velocity sensors 30P, 30Y, and 30R, the angular velocity sensors 30 are provided such that one angular velocity sensor 30 is provided for each of the three axes which are the pitch axis, the yaw axis, and the roll axis. In addition, at least the angular velocity sensor 30P for the pitch axis and the angular velocity sensor 30Y for the yaw axis are mounted on the second circuit portion 282 or the third circuit portion 283. With regard to this, the angular velocity sensor 30R for the roll axis is mounted on the first circuit portion 281.

The angular velocity sensor 30P for the pitch axis and the angular velocity sensor 30Y for the yaw axis are likely to be influenced by unnecessary vibration in comparison with the angular velocity sensor 30R for the roll axis. Therefore, the angular velocity sensor 30P for the pitch axis and the angular velocity sensor 30Y for the yaw axis are mounted on the second circuit portion 282 or the third circuit portion 283, to which unnecessary vibration is less likely to be transmitted, instead of being mounted on the first circuit portion 281 connected to the first wiring part 251 to which unnecessary vibration is likely to be transmitted.

As shown in FIG. 3, the filter circuit 31 is mounted on the first circuit portion 281. Therefore, the sizes of the second circuit portion 282 and the third circuit portion 283 on which the filter circuit 31 is not mounted can be made smaller than the size of the first circuit portion 281.

The first wiring part 251 has a structure in which the patterns of the wiring lines 26 are formed on only one surface of the first wiring part 251 and the flexibility of the first wiring part 251 is higher than the flexibility of the circuit portion 28. In addition, the first wiring part 251 has a structure with no protection film. Therefore, higher flexibility can be imparted to the first wiring part 251. Therefore, it is possible to further reduce a probability that unnecessary vibration is applied to the angular velocity sensors 30 mounted on the circuit portion 28. Meanwhile, the circuit portion 28 has a structure in which patterns of the wiring lines 26 are formed on both surfaces. Therefore, the size of the circuit portion 28 can be reduced in comparison with a structure in which the patterns of the wiring lines 26 are formed on only one surface. A protection film may be provided as long as the flexibility of the first wiring part 251 is sufficiently ensured.

As shown in FIG. 4, the electronic components are mounted on only one surface (the mounting surface 40) of the circuit portion 28. In addition, the cushion 42 is attached to a surface (the attachment surface 41) of the circuit portion 28 that is opposite to the mounting surface 40. Since no electronic component is mounted on the attachment surface 41, the cushion 42 can be brought into close contact with the attachment surface 41. A vibration-reducing effect achieved by the cushion 42 can be enhanced, and the attachment strength of the cushion 42 can also be increased.

In addition, as shown in FIG. 4, the thickness DC of the cushion 42 is greater than the thickness DF of the flexible printed circuit 15 (the circuit portion 28). Therefore, the vibration-reducing effect achieved by the cushion 42 can be further enhanced.

As shown in FIG. 5, the filter circuit 31 is provided for the specific wiring line 26S among the plurality of wiring lines 26, of which the control signal communication frequency is equal to or lower than the set frequency. Since the filter circuit 31 is provided only for the specific wiring line 26S that has a high probability of deterioration in terms of signal quality, the circuit portion 28 can be prevented from being unnecessarily large.

The specific wiring line 26S is a chip select communication line through which a chip select signal for selection of one of a plurality of circuits to be controlled in SPI communication is transmitted. Regarding the chip select communication line, since the communication frequency of the chip select signal is particularly low and the influence of a malfunction is large, the effect of provision of the filter circuit 31 is considerably large.

Figure 6:
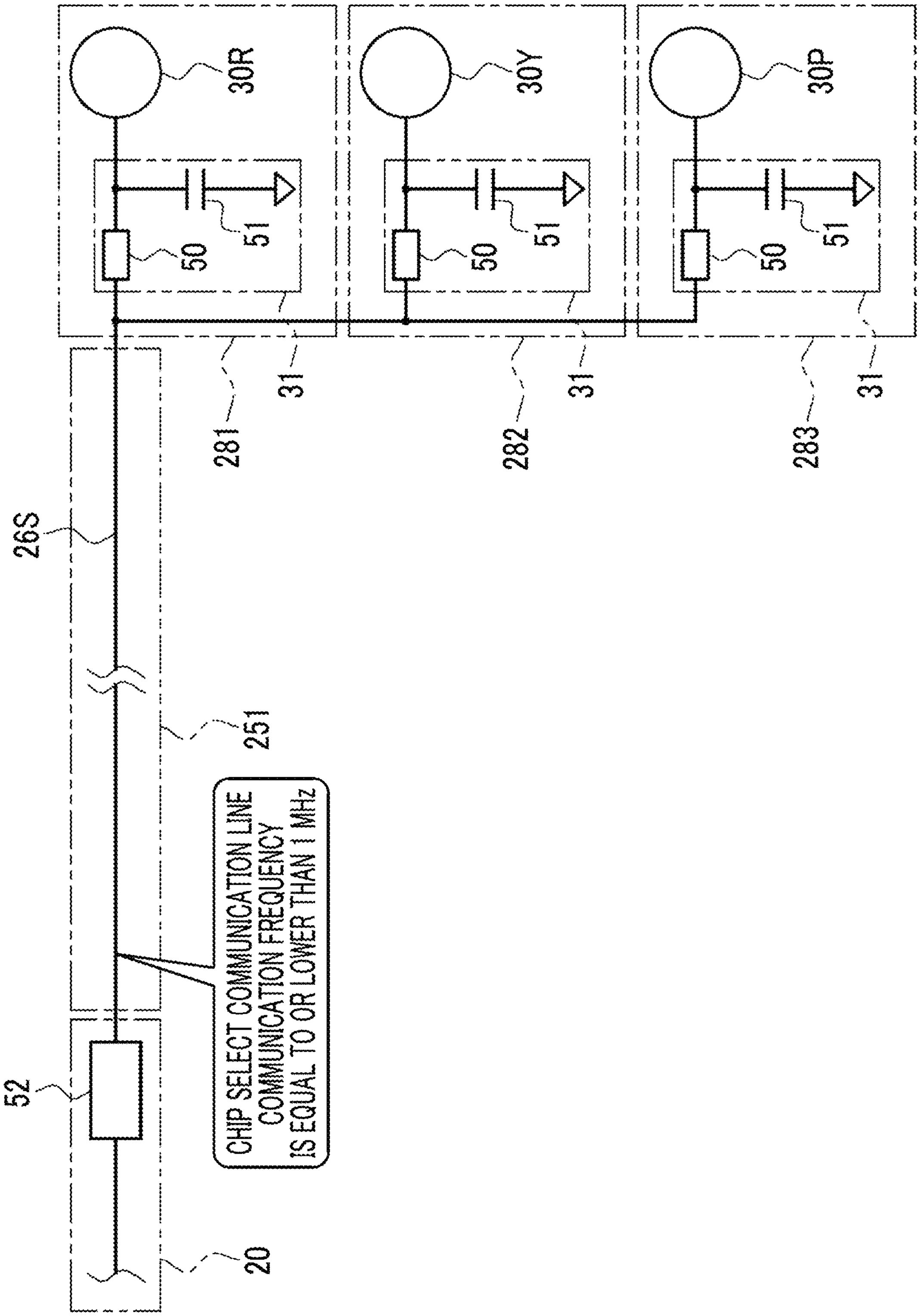
FIG. 6 is a circuit diagram of another example.

Although an example in which one filter circuit 31 is provided with respect to three angular velocity sensors 30 (which are the angular velocity sensors 30P, 30Y, and 30R) is shown in FIG. 5, the present disclosed technology is not limited thereto. For example, as shown in FIG. 6, the filter circuit 31 may be provided for each of the angular velocity sensors 30P, 30Y, and 30R. In this case, one filter circuit 31 is mounted in each of the first circuit portion 281, the second circuit portion 282, and the third circuit portion 283.

Figure 7:
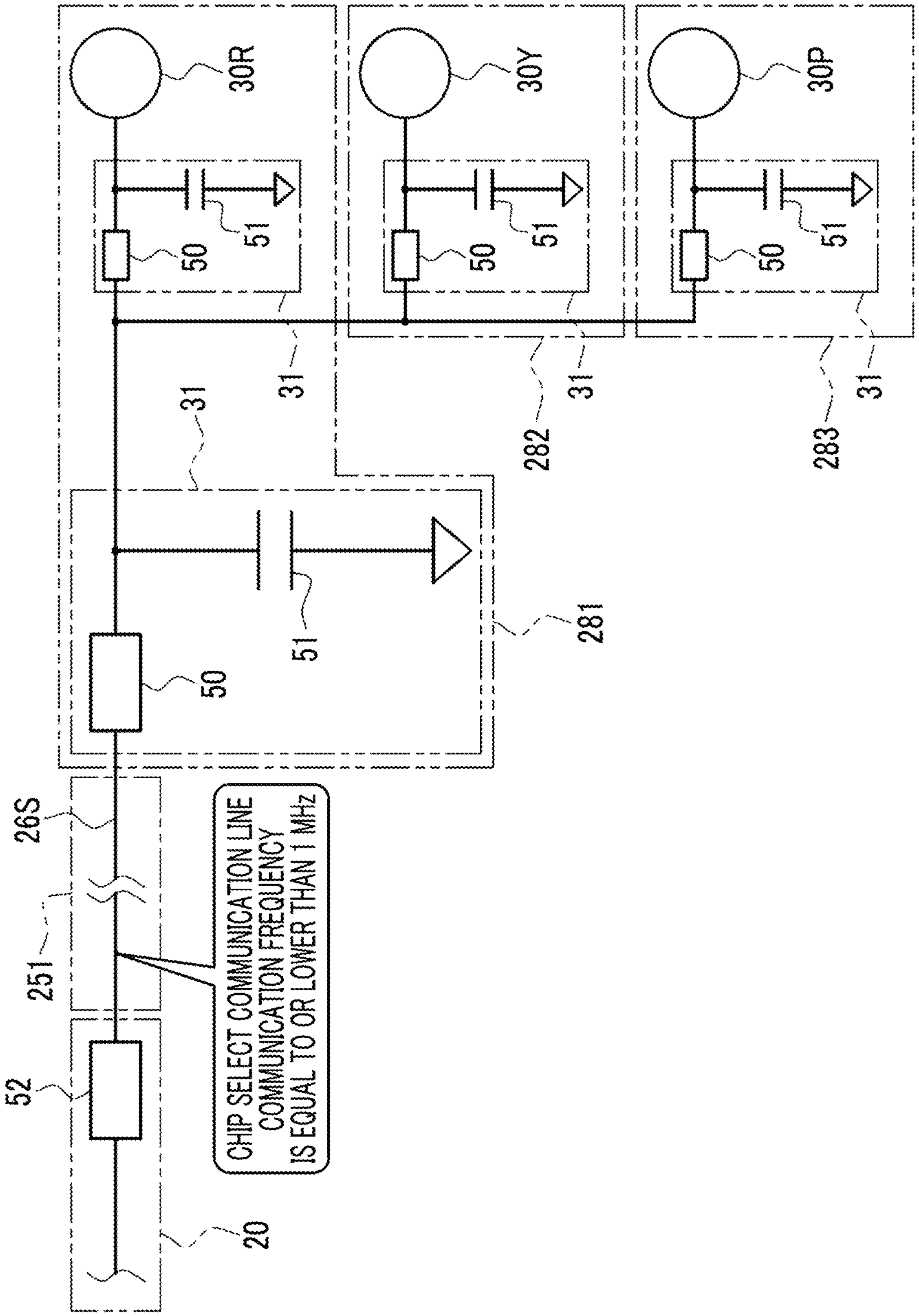
FIG. 7 is a circuit diagram of still another example.

In addition, for example, as shown in FIG. 7, a configuration in which one filter circuit 31 is provided with respect to the angular velocity sensors 30P, 30Y, and 30R and the filter circuit 31 is provided for each of the angular velocity sensors 30P, 30Y, and 30R may also be adopted. In this case, the filter circuit 31 shared by the three angular velocity sensors 30 is mounted on the first circuit portion 281. In addition, the other three filter circuits 31 are mounted on the first circuit portion 281, the second circuit portion 282, and the third circuit portion 283 such that one filter circuit is mounted on each of the circuit portions. Note that in the examples shown in FIGS. 6 and 7, all the filter circuits 31 may be collectively mounted on the first circuit portion 281.

The specific wiring line 26S is not limited to the chip select communication line used as an example. In addition, the number of specific wiring lines 26S may be two or more. Furthermore, the filter circuit 31 may be provided for all the plurality of wiring lines 26.

Although a low-pass filter circuit has been used as an example of the filter circuit 31, the present disclosed technology is not limited thereto. A band pass filter circuit or a high-pass filter circuit may also be adopted. In addition, although a chip select signal for selection of one of a plurality of circuits to be controlled particularly in serial communication has been used as an example of the control signal for the controlling of the operation of the angular velocity sensors 30, the present disclosed technology is not limited thereto. For example, a serial clock (SCLK) signal, a master-out slave-in (MOSI) signal, or a master-in slave-out (MISO) signal in serial communication may also be adopted.

Positions at which the flexible printed circuit 15 and the circuit portion 28, on which the angular velocity sensors 30 are mounted, are disposed are not limited to positions inside the grip portion 14. For example, the circuit portion 28 may be disposed at a right-side portion of the apparatus main body 11 which is opposite to the grip portion 14. In short, a position at which the circuit portion 28 is disposed may be any position as long as the influence of unnecessary vibration on the angular velocity sensors 30 is expected to be relatively small.

Although the shake correction mechanism that moves the imaging element along the YZ plane to correct a subject image shake has been used as an example, the present disclosed technology is not limited thereto. Instead of or in addition to the shake correction mechanism that moves the imaging element along the YZ plane to correct a subject image shake, a shake correction mechanism that moves part of lenses of the imaging lens to correct a subject image shake may also be used.

In addition, an electronic shake correction function may also be used. In the case of the electronic shake correction function, a subject image shake is corrected through, for example, the following processing. First, an imaging element is caused to image a region that is one size larger than a region (hereinafter, an image output region) to be finally output as an image. Then, an image corresponding to the image output region is cut out from an image obtained in this manner and in this case, a position where the image output region is cut is changed in accordance with a shake.

The imaging apparatus according to the present disclosed technology may be a compact digital camera, a smartphone, or a tablet terminal.

It is possible to understand the techniques described in the following supplementary notes from the above description.

Supplementary Note 1

An imaging apparatus including an angular velocity sensor for shake correction, and a flexible printed circuit that includes the angular velocity sensor and a plurality of wiring lines for transmission of a digital control signal for controlling of operation of the angular velocity sensor, in which the flexible printed circuit is provided with a filter circuit for suppression of a specific frequency of the control signal.

Supplementary Note 2

The imaging apparatus described in Supplementary Note 1, in which the flexible printed circuit includes a first wiring part in which patterns of the plurality of wiring lines are formed in parallel, one end of the first wiring part is provided with a connecting portion that is connected to a control circuit sending the control signal, and the other end of the first wiring part is provided with a circuit portion on which electronic components including the angular velocity sensor and the filter circuit are mounted.

Supplementary Note 3

The imaging apparatus described in Supplementary Note 2, in which the circuit portion includes a first circuit portion and a second circuit portion, and a second wiring part is provided between the first circuit portion and the second circuit portion.

Supplementary Note 4

The imaging apparatus described in Supplementary Note 3, in which the second wiring part is flexible.

Supplementary Note 5

The imaging apparatus described in Supplementary Note 4, in which the first circuit portion and the second circuit portion are disposed such that a first plane and a second plane intersect each other with the second wiring part bent, where the first plane is a plane on which the first circuit portion is disposed and the second plane is a plane on which the second circuit portion is disposed.

Supplementary Note 6

The imaging apparatus described in Supplementary Note 5, in which the first plane and the second plane are orthogonal to each other.

Supplementary Note 7

The imaging apparatus described in any one of Supplementary Notes 3 to 6, in which the circuit portion further includes a third circuit portion, and a third wiring part is provided between the second circuit portion and the third circuit portion.

Supplementary Note 8

The imaging apparatus described in Supplementary Note 7, in which the third wiring part is flexible.

Supplementary Note 9

The imaging apparatus described in Supplementary Note 8, in which the first circuit portion, the second circuit portion, and the third circuit portion are disposed such that a first plane, a second plane, and a third plane intersect each other with the second wiring part and the third wiring part bent, where the first plane is a plane on which the first circuit portion is disposed, the second plane is a plane on which the second circuit portion is disposed, and the third plane is a plane on which the third circuit portion is disposed.

Supplementary Note 10

The imaging apparatus described in Supplementary Note 9, in which the first plane, the second plane, and the third plane are orthogonal to each other.

Supplementary Note 11

The imaging apparatus described in any one of Supplementary Notes 7 to 10, in which the angular velocity sensor is provided for each of three axes which are a pitch axis, a yaw axis, and a roll axis, and at least the angular velocity sensor for the pitch axis and the angular velocity sensor for the yaw axis are mounted on the second circuit portion or the third circuit portion.

Supplementary Note 12

The imaging apparatus described in Supplementary Note 11, in which the angular velocity sensor for the roll axis is mounted on the first circuit portion.

Supplementary Note 13

The imaging apparatus described in any one of Supplementary Notes 3 to 12, in which the filter circuit is mounted on the first circuit portion.

Supplementary Note 14

The imaging apparatus described in any one of Supplementary Notes 2 to 13, in which the first wiring part has a structure in which the patterns are formed on only one surface of the first wiring part and flexibility of the first wiring part is higher than flexibility of the circuit portion.

Supplementary Note 15

The imaging apparatus described in any one of Supplementary Notes 2 to 13, in which the first wiring part has a structure in which the patterns are formed on only one surface of the first wiring part and no protection film is provided.

Supplementary Note 16

The imaging apparatus described in any one of Supplementary Notes 2 to 15, in which the circuit portion has a structure in which the patterns are formed on both surfaces of the circuit portion.

Supplementary Note 17

The imaging apparatus described in any one of Supplementary Notes 2 to 16, in which the electronic components are mounted on only one surface of the circuit portion.

Supplementary Note 18

The imaging apparatus described in Supplementary Note 17, in which a vibration-reducing member is attached to a surface of the circuit portion that is opposite to the one surface on which the electronic components are mounted.

Supplementary Note 19

The imaging apparatus described in Supplementary Note 18, in which a thickness of the vibration-reducing member is larger than a thickness of the flexible printed circuit.

Supplementary Note 20

The imaging apparatus described in any one of Supplementary Notes 1 to 19, in which the filter circuit is provided for a specific wiring line among the plurality of wiring lines, of which a control signal communication frequency is equal to or lower than a set frequency.

Supplementary Note 21

The imaging apparatus described in Supplementary Note 20, in which the specific wiring line is a chip select communication line through which a chip select signal for selection of one of a plurality of circuits to be controlled in serial communication is transmitted as the control signal.

Regarding the present disclosed technology, the above-described various embodiments and/or various modification examples can be combined with each other as appropriate. It is needless to say that the present disclosed technology is not limited to each of the embodiments described above and various configurations can be employed without departing from the gist.

Contents described and illustrated above are for detailed description of a part according to the present disclosed technology and are merely an example of the present disclosed technology. For example, description related to the above-described configurations, functions, actions, and effects is description related to an example of configurations, functions, actions, and effects of a part according to the present disclosed technology. Therefore, it is a matter of course that an unnecessary part of the contents described and illustrated above may be deleted, a new element may be added, and replacement may be made without departing from the point of the present disclosed technology. In addition, in order to avoid complication and facilitate the understanding of a portion according to the present disclosed technology, regarding the contents described and illustrated above, description related to common technical knowledge or the like which does not need to be described to enable implementation of the present disclosed technology has been omitted.

In the present specification, the term "A and/or B" is synonymous with the term "at least one of A or B". That is, the term "A and/or B" means only A, only B, or a combination of A and B. In addition, in the present specification, the same approach as "A and/or B" is applied to a case where three or more matters are represented by connecting the matters with "and/or".

All documents, patent applications, and technical standards described in the present specification are incorporated in the present specification by reference to the same extent as in a case where each of the documents, patent applications, and technical standards are specifically and individually indicated to be incorporated by reference.

What is claimed is:

1. An imaging apparatus comprising:

an angular velocity sensor for shake correction; and a flexible printed circuit that includes the angular velocity sensor and a plurality of wiring lines for transmission of a digital control signal for controlling of operation of the angular velocity sensor, wherein the flexible printed circuit is provided with a filter circuit for suppression of a specific frequency of the control signal, the flexible printed circuit includes a first wiring part in which patterns of the plurality of wiring lines are formed in parallel, the plurality of wiring lines are extended along a longitudinal direction of the first wiring part, one end of the first wiring part in the longitudinal direction is provided with a connecting portion that is connected to a control circuit sending the control signal, and the other end of the first wiring part in the longitudinal direction is provided with a circuit portion on which electronic components including the angular velocity sensor and the filter circuit are mounted.

2. The imaging apparatus according to claim 1, wherein the circuit portion includes a first circuit portion and a second circuit portion, and a second wiring part is provided between the first circuit portion and the second circuit portion.

3. The imaging apparatus according to claim 2, wherein the second wiring part is flexible.

4. The imaging apparatus according to claim 3, wherein the first circuit portion and the second circuit portion are disposed such that a first plane and a second plane intersect each other with the second wiring part bent, where the first plane is a plane on which the first circuit portion is disposed and the second plane is a plane on which the second circuit portion is disposed.

5. The imaging apparatus according to claim 4, wherein the first plane and the second plane are orthogonal to each other.

6. The imaging apparatus according to claim 2, wherein the circuit portion further includes a third circuit portion, and a third wiring part is provided between the second circuit portion and the third circuit portion.

7. The imaging apparatus according to claim 6, wherein the third wiring part is flexible.

8. The imaging apparatus according to claim 7, wherein the first circuit portion, the second circuit portion, and the third circuit portion are disposed such that a first plane, a second plane, and a third plane intersect each other with the second wiring part and the third wiring part bent, where the first plane is a plane on which the first circuit portion is disposed, the second plane is a plane on which the second circuit portion is disposed, and the third plane is a plane on which the third circuit portion is disposed.

9. The imaging apparatus according to claim 8, wherein the first plane, the second plane, and the third plane are orthogonal to each other.

10. The imaging apparatus according to claim 6, wherein the angular velocity sensor is provided for each of three axes which are a pitch axis, a yaw axis, and a roll axis, and at least the angular velocity sensor for the pitch axis and the angular velocity sensor for the yaw axis are mounted on the second circuit portion or the third circuit portion.

11. The imaging apparatus according to claim 10, wherein the angular velocity sensor for the roll axis is mounted on the first circuit portion.

12. The imaging apparatus according to claim 2, wherein the filter circuit is mounted on the first circuit portion.

13. The imaging apparatus according to claim 1, wherein the first wiring part has a structure in which the patterns are formed on only one surface of the first wiring part and flexibility of the first wiring part is higher than flexibility of the circuit portion.

14. The imaging apparatus according to claim 1, wherein the first wiring part has a structure in which the patterns are formed on only one surface of the first wiring part and no protection film is provided.

15. The imaging apparatus according to claim 1, wherein the circuit portion has a structure in which the patterns are formed on both surfaces of the circuit portion.

16. The imaging apparatus according to claim 1, wherein the electronic components are mounted on only one surface of the circuit portion.

17. The imaging apparatus according to claim 16, wherein a vibration-reducing member is attached to a surface of the circuit portion that is opposite to the one surface on which the electronic components are mounted.

18. The imaging apparatus according to claim 17, wherein a thickness of the vibration-reducing member is larger than a thickness of the flexible printed circuit.

19. The imaging apparatus according to claim 1, wherein the filter circuit is provided for a specific wiring line among the plurality of wiring lines, of which a control signal communication frequency is equal to or lower than a set frequency.

20. The imaging apparatus according to claim 19, wherein the specific wiring line is a chip select communication line through which a chip select signal for selection of one of a plurality of circuits to be controlled in serial communication is transmitted as the control signal.

* * * * *